United States Patent
Lehmann et al.

Patent Number: 5,741,061
Date of Patent: Apr. 21, 1998

[54] LIGHT-UP PLANTER

[76] Inventors: Roger W. Lehmann; Michael I. Satten, both of 3100 Woodbridge Ave. Suite 102, Edison, N.J. 08837

[21] Appl. No.: 755,043

[22] Filed: Nov. 22, 1996

[51] Int. Cl.⁶ .................................................. F21V 31/00
[52] U.S. Cl. .................................. 362/154; 362/805
[58] Field of Search ............................. 362/805, 154

[56] References Cited

U.S. PATENT DOCUMENTS 2,723,341  11/1955  Greenspan.
4,349,864   9/1982  Smith.

FOREIGN PATENT DOCUMENTS

2608891 A  12/1986  France.
2688648     1/1991  France.
2230684     4/1990  United Kingdom.

OTHER PUBLICATIONS

Japanese published abstract 06284823A.

*Primary Examiner*—Carroll B. Dority
*Attorney, Agent, or Firm*—Caesar, Rivise, Bernstein, Cohen & Pokotilow, Ltd.

[57] ABSTRACT

A planter which includes at least one light source such that light emitted by the light source may illuminate a plant contained within the planter and also illuminates the floor on which the planter rests. The light illuminating the plant is directed at an upward angle to efficiently illuminate the plant in an aesthetically pleasing manner.

10 Claims, 3 Drawing Sheets

LIGHT-UP PLANTER

FIELD OF THE INVENTION

The present invention relates to plant holders, and in particular to plant holders which provide illuminating means both the plant contained within the plant holder as well as the floor on which the planter rests.

BACKGROUND OF THE INVENTION

A wide variety of decorative planters have been utilized in many environments to bring beauty and enjoyment to those around them. Decorative planters also function to hold plants which produce oxygen and decrease carbon monoxide thus providing a healthy alternative for homes, offices and public buildings.

Currently there is a demand from the public for interior decorative lighting for, for example, housing offices and shopping malls. There is also a concurrent trend in decorating the interior of such buildings with indoor and/or tropical plants. An advantage provided by this invention is therefore that it combines within a single portable article means for providing each of the above decorative features.

Various types of planters have been known in the art. For example, various references have disclosed the general concept of a planter with electric lights at or near the upper edge, shining on the plants, see for example, French published patent application 2,608,891A, French published patent application 2,688,648, British published patent application 2,230,684A and Japanese published abstract 06284823A.

United States patents relating to the general concept of planters with lighting include U.S. Pat. No. 2,723,341 (Greenspan). U.S. Pat. No. 4,349,864 (Smith) claims a structure in which the lights are below the plant container.

Accordingly, the present invention comprises a plant holder incorporating at least one light source such that light emitted is upwardly angled to more effectively illuminate a plant contained within the plant holder. The light is also emitted in a second direction to illuminate the floor on which the plant holder is placed.

Preferably, the light source is retained adjacent to the outer edge of the plant holder, at or near the top of the plant holder and is preferably angled approximately 45 degrees upward from the upper horizontal surface of the planter. The light source is recessed in a downwardly extending lip located near the top of the plant holder to also direct light to the floor on which the plant holder rests.

SUMMARY OF THE INVENTION

A plant holder which includes at least one light source such that light emitted by the light source may illuminate a plant contained within the plant holder and also illuminates the floor on which the plant holder rests. The light illuminating the plant is directed at an upward angle to efficiently illuminate the plant in an aesthetically pleasing manner, especially when taller plants or trees are utilized. Such light is also cast upon the floor.

BRIEF DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE INVENTION

Figure 1:
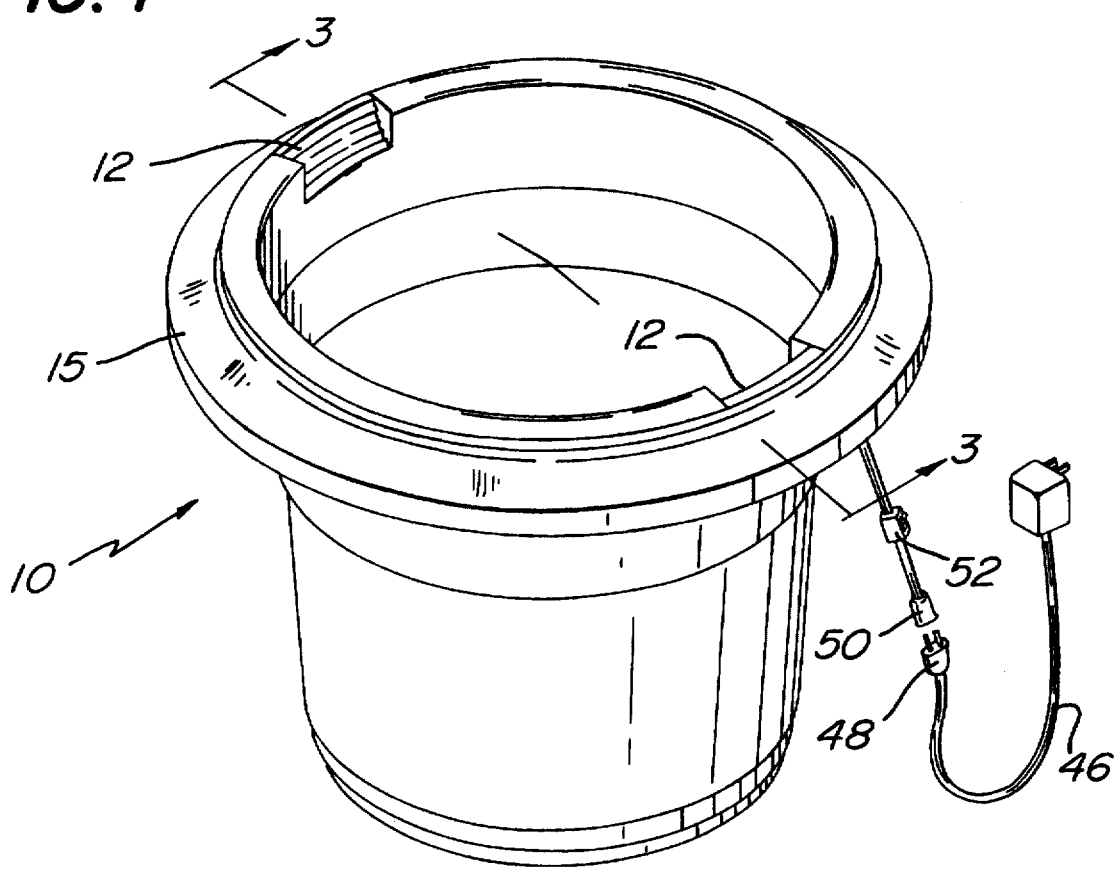
FIG. 1 is a perspective view of a planter of the present invention showing two separate light sources for illuminating a plant placed in the plant holder.
Figure 2:
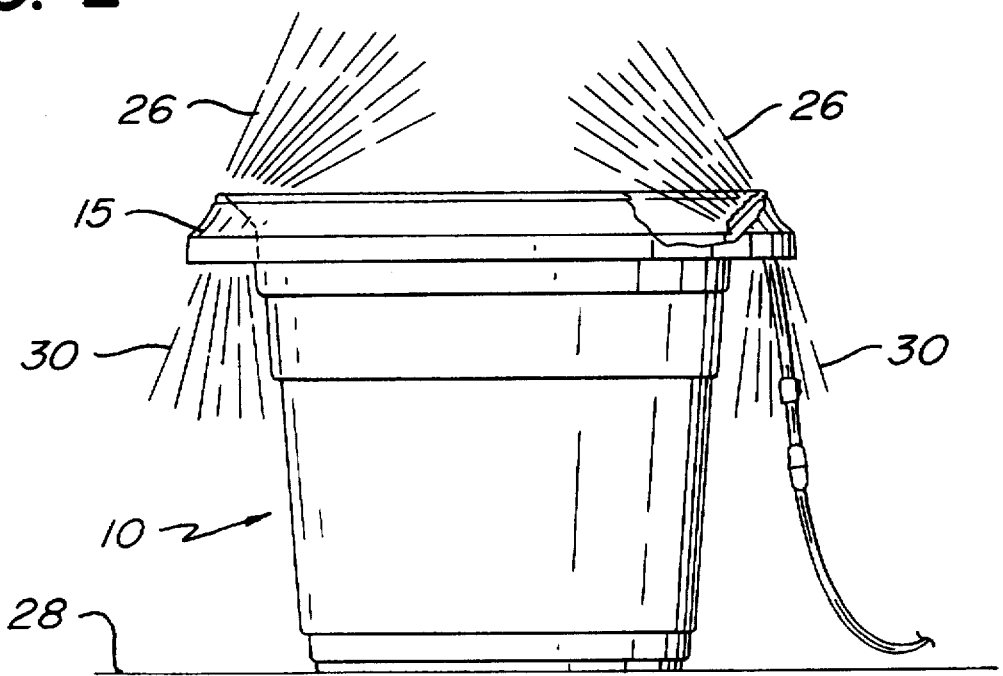
FIG. 2 is a side view of a planter of the present invention showing two separate light sources for illuminating a plant placed in the plant holder.

Referring now to various figures of the drawings where like reference numerals refer to like parts, as shown in FIGS. 1 and 2, the present invention comprises a plant holder or planter 10 with vertical wall 13 and having substantially the same internal shape and water draining means as conventional plant pots. The planter 10 however also includes light sources 12 on the upper lip 15 of the planter 10 at or near the top thereof. The embodiment shown in FIGS. 1 and 2 includes two opposed light sources, however, additional light sources may be utilized if desired.

The opposed light sources 12 are identical and thus only the details of one of the sources 12 will be described for brevity. Each of light sources 12 are suitable for the retention of a conventional replaceable bulb 14 as shown in FIGS. 3 through 7.

As shown in FIGS. 3 to 6, bulb sockets 16 can then suitably retain the incandescent bulbs 14 or other light sources in a substantially horizontal direction.

Figure 4:
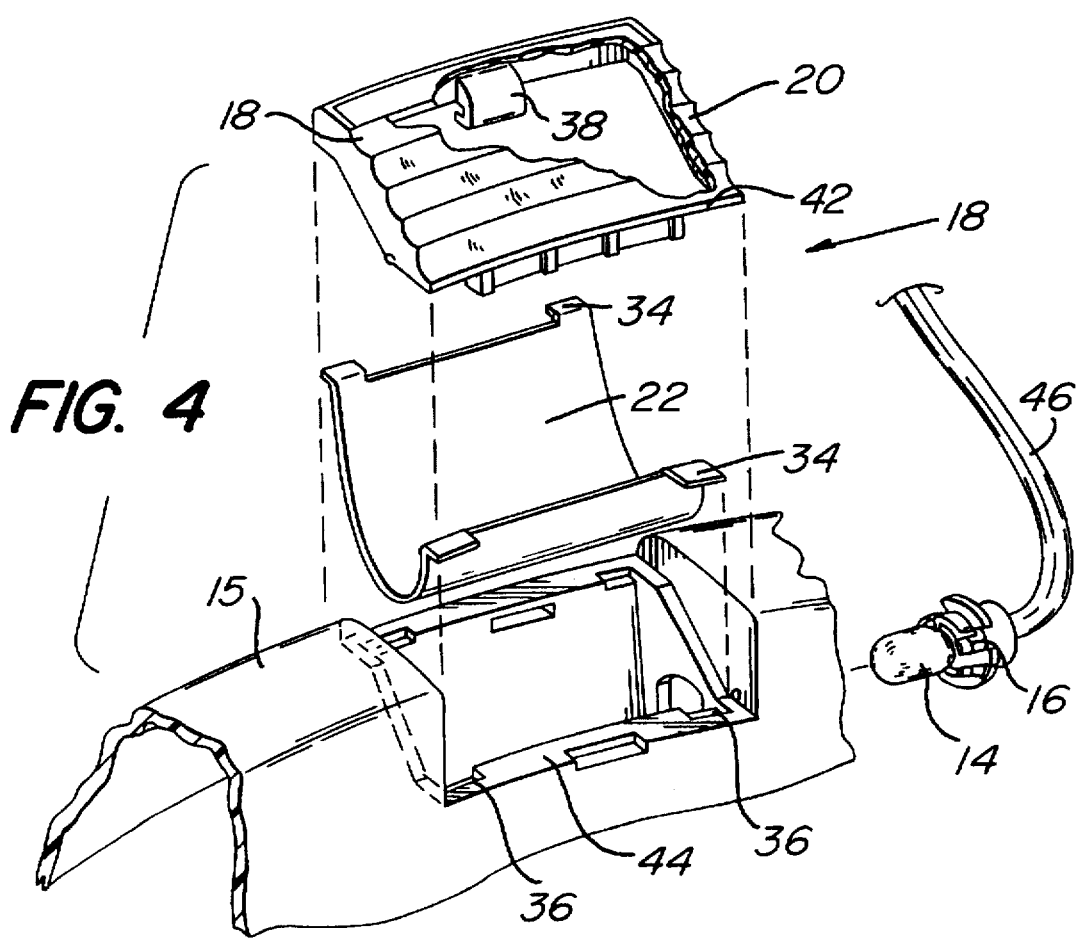
FIG. 4 is an enlarged partially exploded view of the details of planter structure in proximity with one of the illumination sources.
Figure 5:
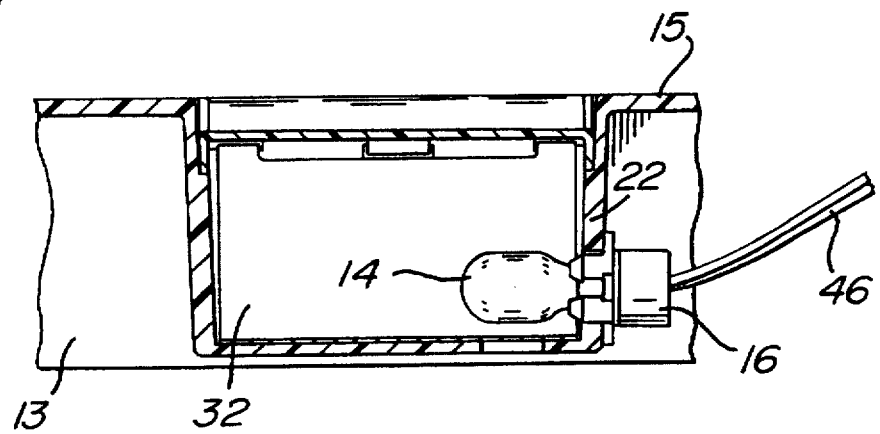
FIGS. 5 and 6 are partial cross-sectional views of the planter shown in FIG. 3 taken along lines 5—5 and 6—6, respectively, to show details of the planter adjacent to the light source.
Figure 6:
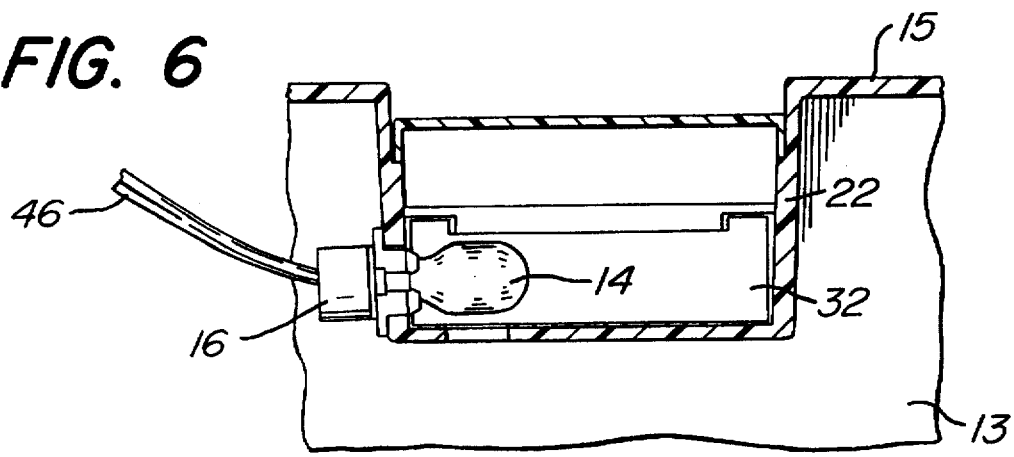
Figure 7:
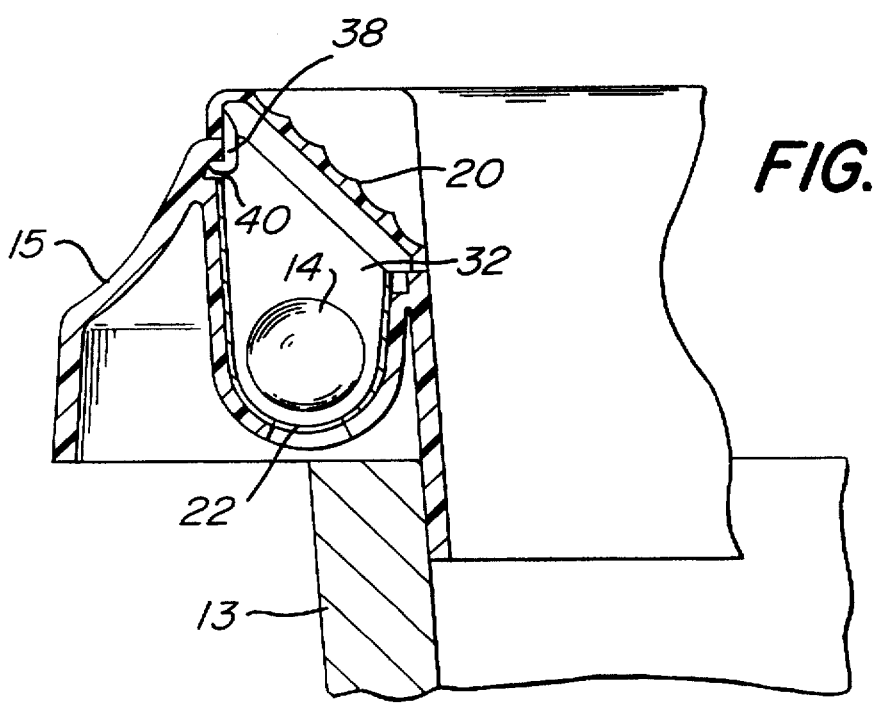
FIG. 7 is a partial sectional view of the planter of the present invention showing further details of the light source and the surrounding structure.

As shown in FIG. 4, translucent enclosure means 18 are retained adjacent to the upper lip 15 of the plant holder 10 at or near the top thereof.

Figure 3:
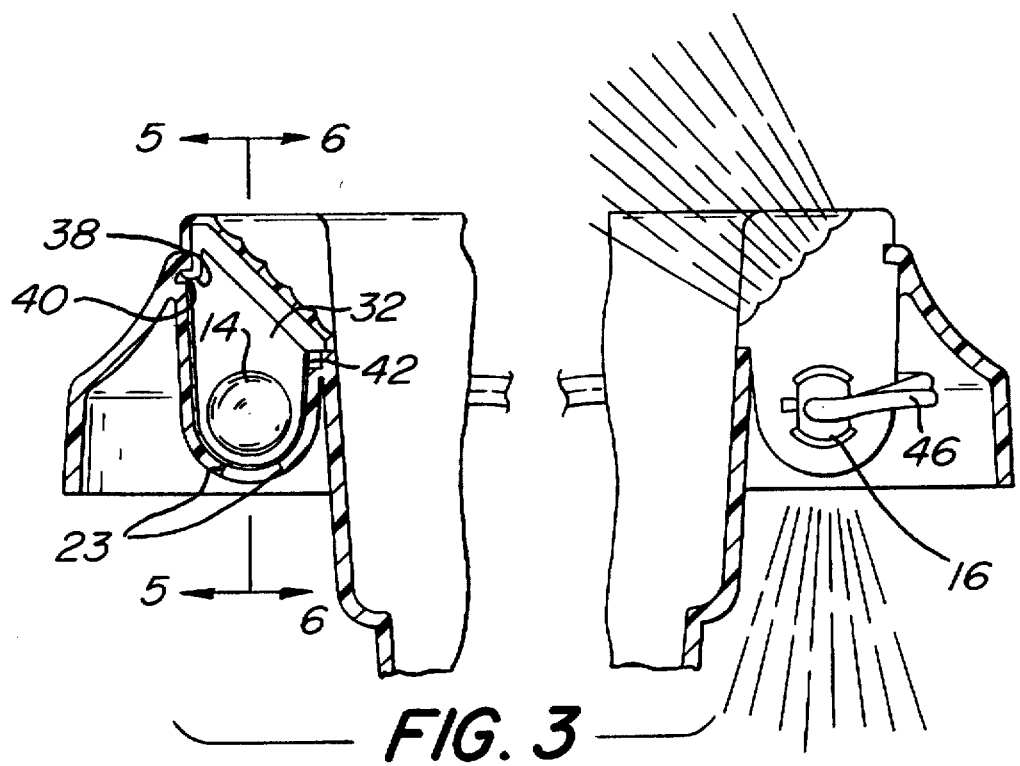
FIG. 3 is a partial cross-sectional view of the planter shown in FIG. 1 taken along lines 3—3, to show details of the two opposed lights utilized as the plant and floor illumination source.

Each enclosure means 18 has an upper translucent portion 20 to permit light to illuminate the plant (not shown) in the plant holder 10 by transmitting the light in an angled and upward direction as shown by lines 26 of FIGS. 2 or 3. The angular orientation of the light, approximately 45 degrees from horizontal more effectively illuminates the plant, especially taller plants or trees which may be placed in the plant holder 10. The upper translucent portion 20 may additionally comprise a convex lens surface to aid in focusing the light produced in the upward desired direction.

Opposite the upper translucent portion 20 is a light reflector 22 (FIG. 7) which directs light upward to translucent portion 20. The light reflector 22 may have slots 23 to permit the directing of some of the light downward toward the floor 28 to illuminate the floor 28 as shown by lines 30, through openings in cavity 32.

Each of the upper translucent portions 20 and light reflector portions 22 form a cavity 32 suitable for inserting an incandescent bulb 14. Further, the cavity 32 permits substantially all of the light to emanate therefrom in both directions, upward toward the plant and downward toward the floor.

The upper translucent portion 20 is sealable and engages the plant holder to prevent water ingression into the bulb sockets 16. The upper portions 20 also be transparent, colored, frosted, include a lens member, etc. adapted to provide particular lighting effects and also may be tinted to provide colored lighting. By angling the direction, the light 26 illuminates the plant and it is possible to create a wide variety of pleasing effects not heretofore achievable with the prior art illuminated plant holders.

As shown in FIG. 4, each of the light reflector 22 are held in place by tabs 34 which protrude into recesses 36 in the upper lip 15 of the plant holder 10 at or near the top thereof. The light reflector 22 may also be held in place when the upper translucent portion 20 is placed on top thereof to form cavity 32.

In addition, as shown in FIGS. 3 and 4, upper translucent portion 20 also includes an internal tab 38. The internal tab 38 fits into recess 40 (FIG. 3) in upper lip 15 to releasably retain the upper translucent portion 20 in place. By sliding the tab 38 away from the recess by squeezing the upper translucent portion 20 one can easily remove it to access the light bulb 14 if needed.

To further aid in retaining the upper translucent portion 20 in place, the upper portion 20 includes lip 42 as shown in FIGS. 3 and 4. Lip 42 rests on the lower edge 44 of planter lip 15 when the upper portion 20 is place.

As shown in FIGS. 3—7, bulb sockets 16 suitably retain the incandescent bulbs 14 in a substantially horizontal direction. Although any type of bulb sockets can be utilized depending upon the circumstances of use, preferably snap in bulb sockets are used to retain bulbs 14 by snapping the bulb 14 into the bulb socket base. Although incandescent bulbs 14 are shown used, other types of bulbs, e.g., halogen, fluorescent can be utilized in the present invention depending upon the circumstances of use.

As shown in FIGS. 3–6, each bulb socket 16 is electrically connected to a conventional power source via cord 46. As shown in FIG. 1, cord 46 is releasably connectable to the plant holder 10 by plug and connecting lead 48 which fits into connector lead 50. An on/off power switch 52 is also located on the connecting lead 46 to enable the user to easily turn the plant holder on/off as desired. Alternatively, one may include a photo cell to turn the plant holder off/on in accordance with the daily lighting changes.

Although not shown in detail the cord 46 can be spliced together in such a way that each of the bulbs 16 can be supplied from a common electrical source.

In operation, incandescent bulbs 14 will emit heat. Heat sink means (not shown) may therefore be provided such that a substantial amount of this heat will be absorbed and radiated away by the heat sink means thus reducing the amount of heating of the plant holder. Light reflector 22 may also act as a heat sink.

The preferred embodiment of the invention disclosed provides a particularly simple, easily maintained, inexpensive and portable article providing the desirable property of illuminating a plant or plants with white or colored light. It should however, be appreciated that other modifications may be made within the scope of the invention, and that the invention extends to any type of plant holder, not only plant pots, made from, for example, plastic, clay or porcelain. Obviously, the shape and configuration of the pot itself, and/or the enclosures, may be varied as may the number of lights provided.

In another embodiment of the invention, a ring is provided (planter ring) which can be secured to an upper lip of an unilluminated planter. The planter ring has at least one light source in the manner of one or more light sources 12. It is preferred that the light source(s) be so oriented that when the ring is secured to the planter, the light from the light source will be directed upwardly at an approximately 45° angle in order to illuminate a plant contained within the planter.

The planter ring may be of a wooden or ceramic material with a coloring to blend in with or match the planter color and texture in an esthetic way. The planter ring may be secured to the upper lip or surface of the top of the planter in a known way, such as by an adhesive or mechanically in a clamping action or by fasteners.

Without further elaboration the foregoing will so fully illustrate my invention that others may, by applying current or future knowledge, adapt the same for use under various conditions of service.

We claim:

1. A planter ring adapted to be secured to an upper lip of a planter, said ring incorporating at least one light source so oriented that when said ring is secured to said planter, the light source from said light will be directed upwardly at an approximately 45° angle in order to illuminate a plant contained within the planter.

2. A planter ring as claimed in claim 1, wherein the light source is partially enclosed by enclosure means, the enclosure means being retained when the planter ring is secured to the upper lip, adjacent to the upper lip of the planter in such a way as to form a cavity between the enclosure means and the planter upper lip, such that substantially all the light emitted by the light source is directed through the cavity towards a plant contained within the planter and also toward the floor on which the planter rests.

3. A planter ring as claimed in claim 2, wherein the cavity is covered by a transparent or translucent cover member.

4. A planter ring as claimed in claim 3, wherein the enclosure means is detachable from the planter to allow access to the light source.

5. A planter ring as claimed in claim 3, wherein the light source comprises at least one incandescent bulb.

6. A planter ring as claimed in claim 3, wherein the translucent cover member sealable engages the cavity to prevent water ingression into the enclosure means.

7. A planter ring as claimed in claim 6, wherein the cover member is a lens, diffuser member or filter adapted to provide a particular lighting effect.

8. A planter ring as claimed in claim 1, wherein the planter is made from plastic or clay or porcelain.

9. A planter ring as claimed in claim 1, wherein the light is directed at an angle toward the plant in the planter.

10. A planter ring as claimed in claim 2 wherein the enclosure means has slots that enable the directing of light towards the floor on which the planter rests.

* * * * *